United States Patent [19]
Bonnet

[11] Patent Number: 5,547,063
[45] Date of Patent: Aug. 20, 1996

[54] APPARATUS AND METHOD OF SORTING OBJECTS

[75] Inventor: Henri Bonnet, Atlanta, Ga.

[73] Assignee: United Parcel Service of America Inc., Atlanta, Ga.

[21] Appl. No.: 248,057

[22] Filed: May 24, 1994

[51] Int. Cl.$^6$ .............................. B65G 37/00; B65G 47/10
[52] U.S. Cl. .................. 198/370.02; 198/836.1; 209/653; 209/917
[58] Field of Search .................. 198/367, 367.1, 198/370.02, 372, 836.1, 836.3; 209/596, 651, 653, 900, 916, 917; 271/298, 303, 305

[56] References Cited

U.S. PATENT DOCUMENTS

| | | | |
|---|---|---|---|
| 1,590,639 | 6/1926 | Marsh, Jr. ........................... | 198/836.1 |
| 2,643,767 | 6/1953 | Baker .................................. | 209/651 X |
| 3,757,942 | 9/1973 | Gunn ................................... | 209/900 X |
| 3,955,678 | 5/1976 | Moyer ................................. | 209/583 X |
| 4,031,998 | 6/1977 | Suzuki et al. ..................... | 198/365 |
| 4,089,404 | 5/1978 | Venzke ............................... | 198/365 |
| 4,712,965 | 12/1987 | Canziani ........................... | 198/365 X |
| 4,716,686 | 1/1988 | Lisec ................................... | 198/836.1 X |
| 4,722,430 | 2/1988 | Canziani ........................... | 198/365 |
| 4,744,454 | 5/1988 | Pölling ............................... | 198/365 |
| 4,838,435 | 6/1989 | Alexandre et al. ................ | 209/584 X |
| 4,846,335 | 7/1989 | Hartlepp ............................ | 198/365 |
| 4,856,642 | 8/1989 | Nicholson et al. ................ | 198/365 |
| 4,929,147 | 5/1990 | Jenkner ............................. | 198/836.1 X |
| 4,982,828 | 1/1991 | Nicolson et al. .................. | 198/365 |
| 5,018,928 | 5/1991 | Hartlepp ............................ | 198/365 X |
| 5,054,601 | 10/1991 | Sjogren et al. ..................... | 198/365 |
| 5,086,905 | 2/1992 | Pölling ............................... | 198/365 |

FOREIGN PATENT DOCUMENTS 715405  2/1980  U.S.S.R. .............................. 198/372

Primary Examiner—William E. Terrell
Assistant Examiner—Tuan Nguyen
Attorney, Agent, or Firm—Jones & Askew

[57] ABSTRACT

A sorting system for sorting packages at high speed to a large number of destinations by automation. The sorting system provides a feeding mechanism for depositing flat packages in an upright position on a conveying system. The conveying system includes lower and upper conveyors for supporting the package. Ejection modules are included along the length of the conveying system for guiding as well as ejecting individual packages along the conveying system. The ejection module extends around the items to prevent falling of the items in a first position, and breaks away from the around the article when a plunger pushes the article from the path.

5 Claims, 5 Drawing Sheets

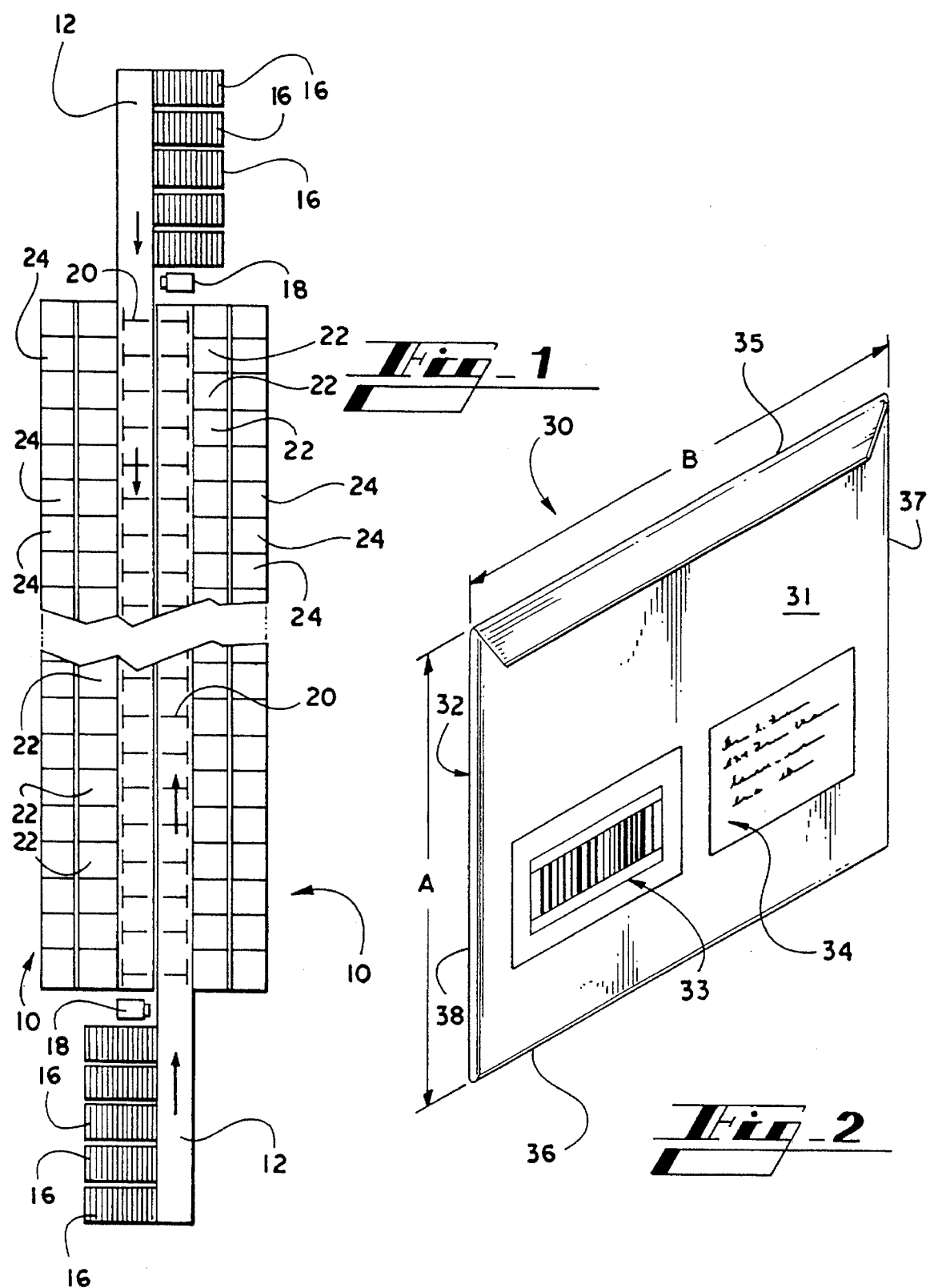

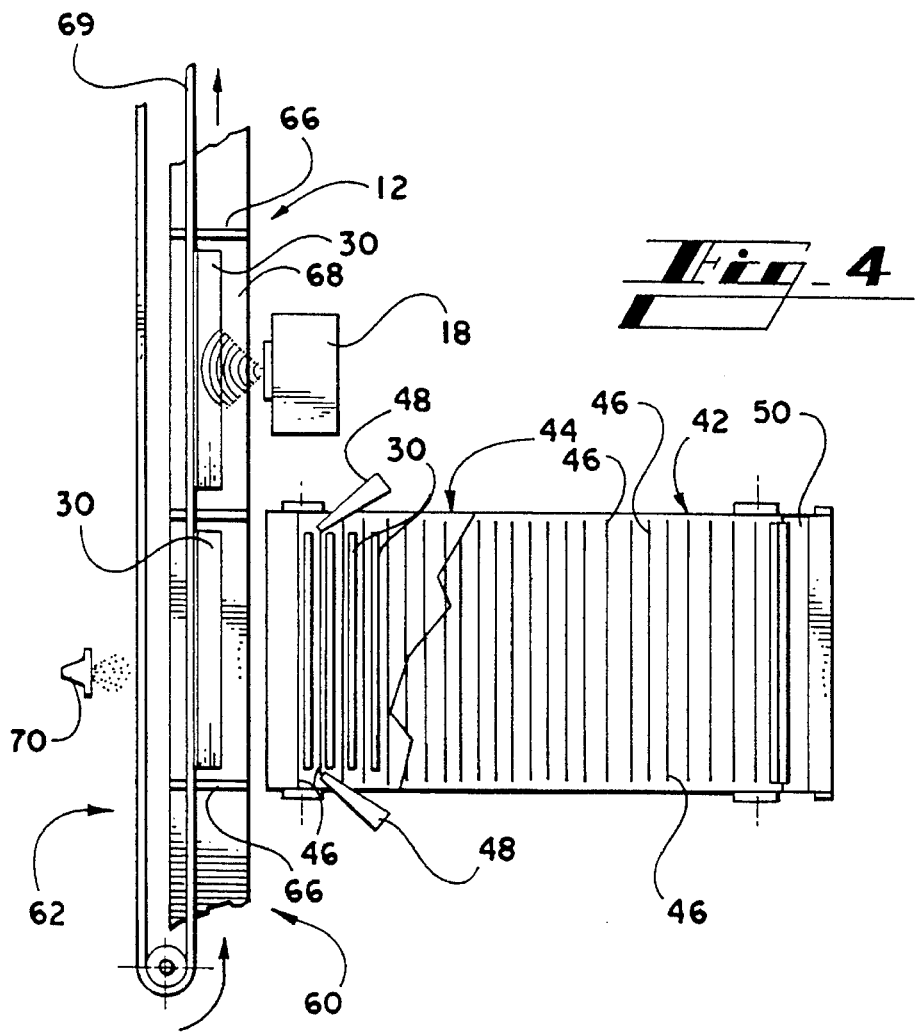
Fig_4
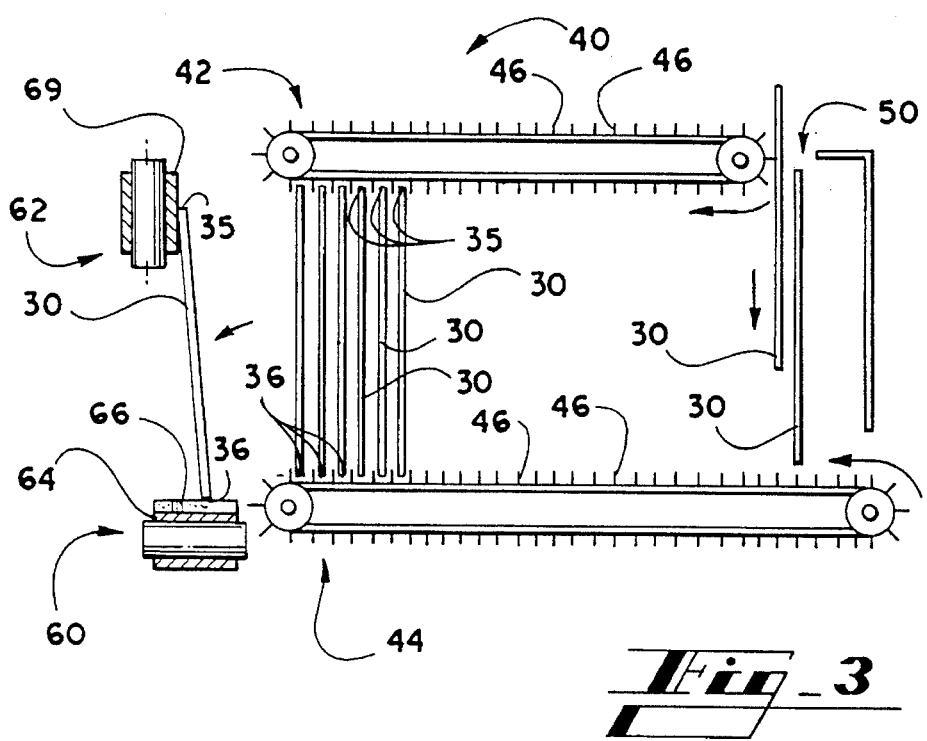
Fig_3

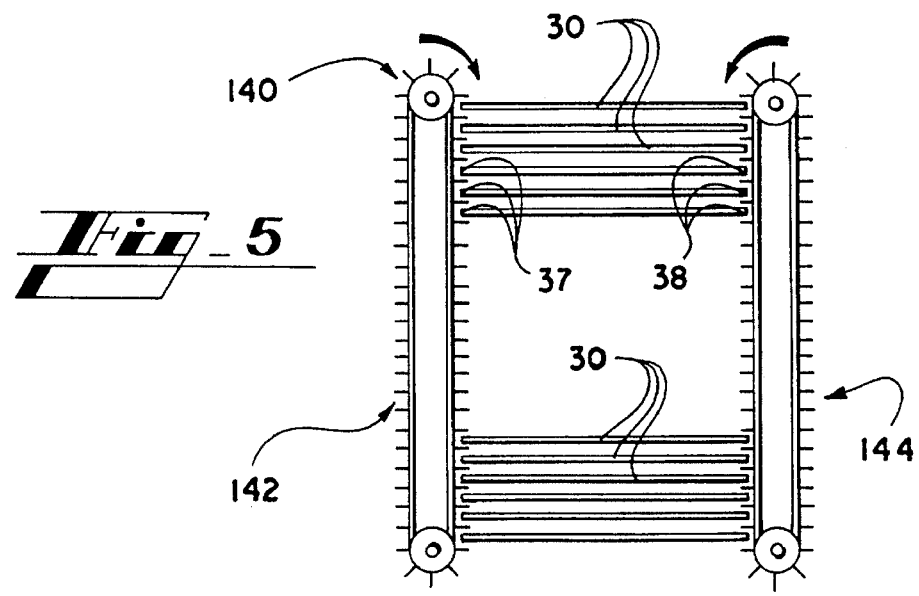

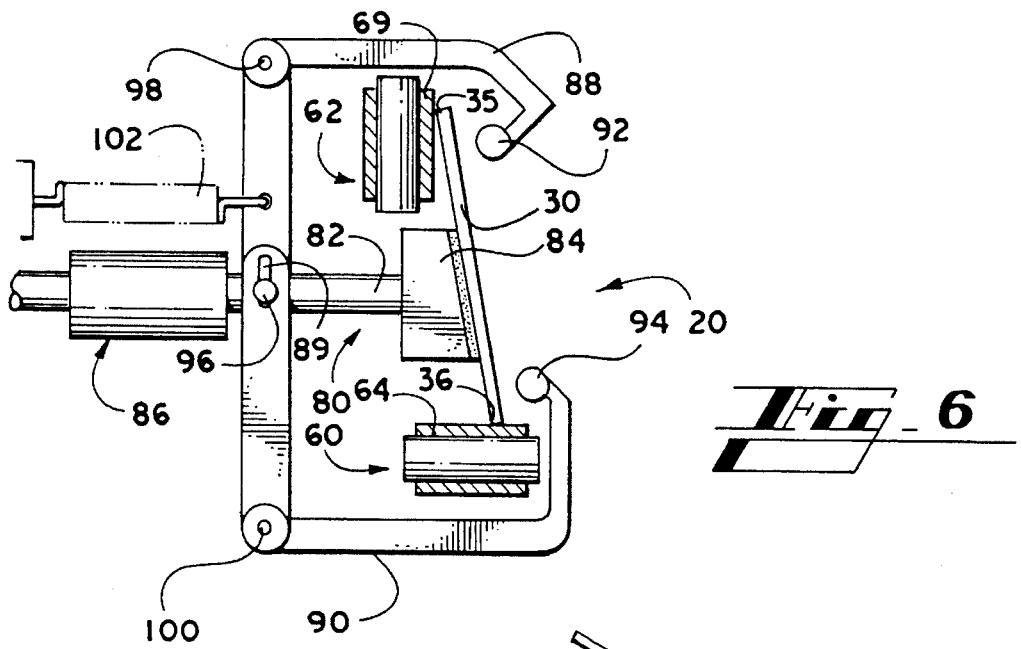
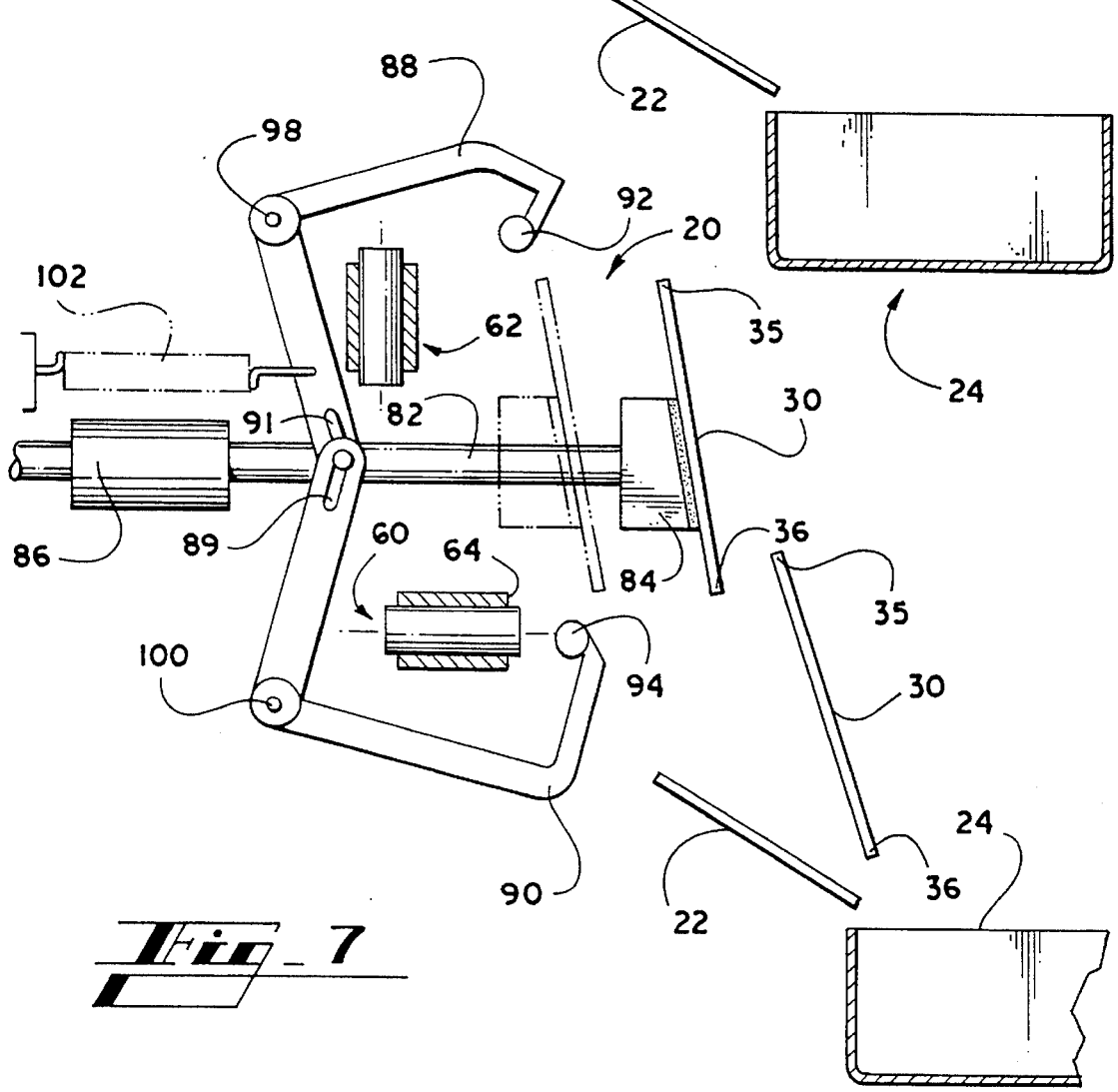

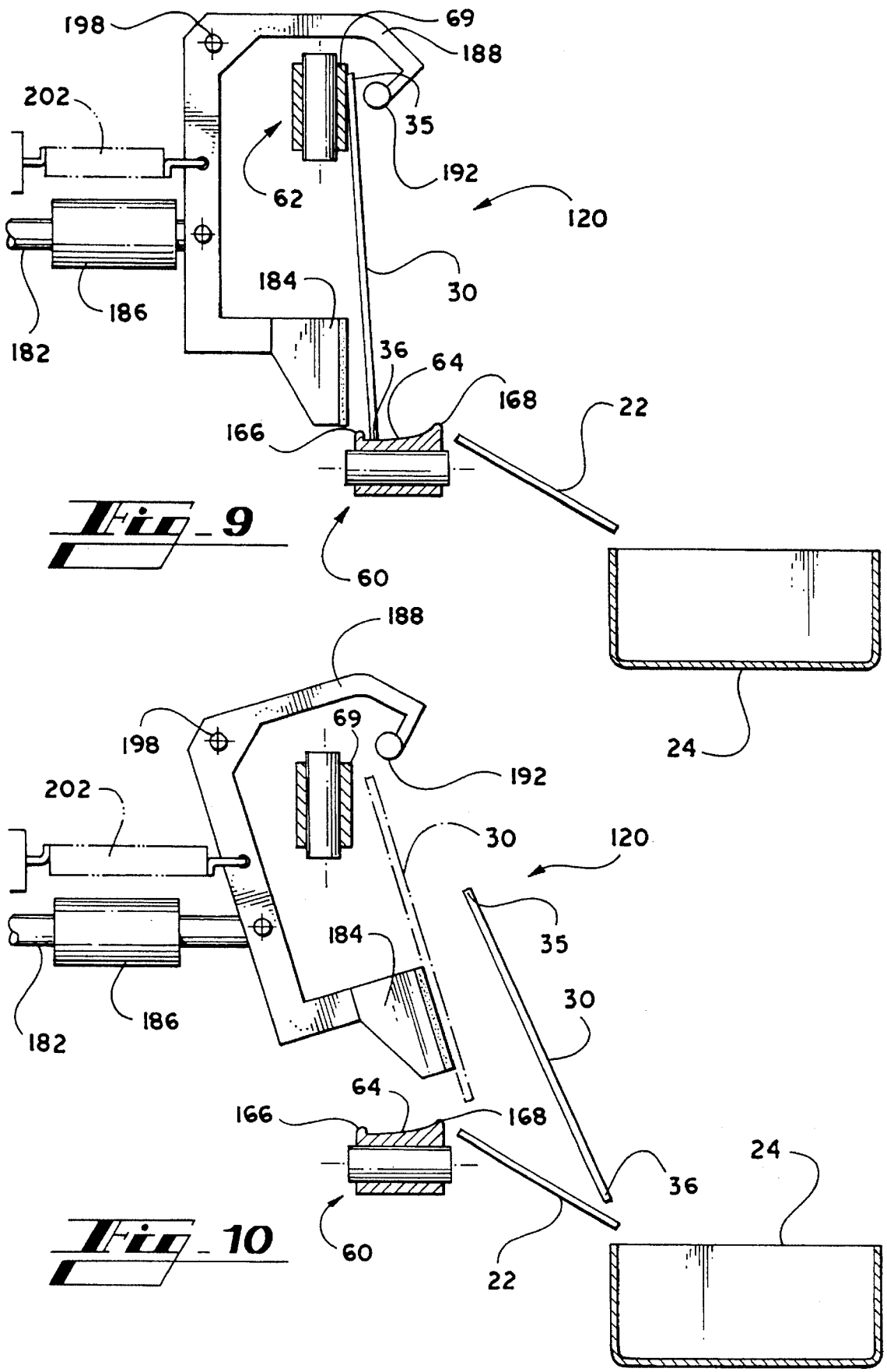

APPARATUS AND METHOD OF SORTING OBJECTS

TECHNICAL FIELD OF THE INVENTION

This invention relates to an apparatus for and method of automatically sorting objects such as packages or letters at a high speed and to a large number of destinations by automation.

BACKGROUND OF THE INVENTION

The use of sorting machines to separate packages along an automated system is known. Such systems are useful in sorting a large number of packages for delivery to a number of different regions, such as zip code areas. Under the control of a computer or programmed logic controller, the packages are identified or coded as they enter the system, and may then be tracked for output at a chute or bin corresponding to the coded information.

Many deliveries are made in standardized letters of a specified size (such as 9 ½×12 ½ inches). These envelopes are often called "flats" or "flat letters" in the shipping industry. The size and construction of the flat letters is standardized so that they may be handled and sorted quickly. Because coded data is imprinted on the sides of these envelopes concerning their destination, it is preferable that the envelopes be sorted such that the information on the flats may be read by a scanner as the flat letters move along a sorting line.

U.S. Pat. No. 4,838,435 to Alexandre and U.S. Pat. No. 3,757,942 to Gunn each disclose envelope sorters which allow sorting in a generally upright position so that coded information may be read on the envelopes as they proceed along a line. The patent to Alexandre discloses a conveyor assembly for processing photograph envelopes. The assembly includes a lower, horizontal conveyor belt for moving the envelopes along the line and two guide rails which extend above and beside the lower conveyor for preventing the envelopes from falling. In this manner, the envelopes are delivered in a substantially vertical orientation. A variety of different sorting modules are provided along the conveyor for separating out packages which are too long, too thick, or unmarked. Each of these sorting modules includes an opening in one guide rail and a flap built in as part of the other guide rail. When a reject envelope approaches the sorting module, the flap is operated to reroute the envelope out through the opening in the other guide rail.

The manner of feeding the letters into the sorting system, known as the feeding mechanism, of Alexandre, dumps envelopes, standing up or lying down, on a receiving belt consisting of a horizontal endless belt. At the output of this receiving belt, the envelopes are suctioned onto a vertical, air-permeable conveyor belt by a vacuum which is located on the other side of the vertical belt. The envelopes are then fed into the horizontal conveyor belt between the two guide rails so that the envelope is maintained in the substantially vertical orientation.

Gunn discloses an envelope sorter having a lower, horizontal conveyor belt for supporting the bottom of the envelope and an upper, substantially vertical conveyor belt supporting the top of the envelope. The system relies solely on gravity for keeping the envelopes on the conveyors, and therefore the envelopes are transported down the line in an orientation which is substantially vertical, but slightly tilted from vertical. A movable sorting bin at the end of the conveyor belt moves responsive to a bar code reading on the envelopes so that the envelopes may fall from the end of the belts into a proper chute. The feeding mechanism of Gunn provides envelopes in a slanted orientation, approximately 45° to vertical, down to a roller. The roller then feeds the envelopes, one at a time, onto the two conveyor belts.

Several problems exist with these prior art sorting systems. First, the feeding mechanisms for depositing the envelopes into the sorting systems are unreliable, especially for the stiffened cardboard flats that are used in the industry today. The feeding mechanism of Gunn is designed for flexible envelopes which can be easily turned and rolled onto the conveyor by the roller of that system. The roller could be inadequate for feeding stiffened cardboard flats. Moreover, the feeding mechanism of Gunn does not insure exact positioning of the envelopes on the conveyor belt, but instead drops envelopes on the conveyor belt as the roller reaches the end of the envelope. If envelopes are not positioned exactly the same in the slanted feeding trough of Gunn, the envelopes could not be fed into the conveyor system in a consistent manner. The feeding mechanism of Alexandre, on the other hand, has its own problems. The suction conveyor of that system may drop an envelope in any orientation onto the horizontal conveyor. There is also no provision in Alexandre for timed entry of the envelopes into the sorting system. Instead, the feeding mechanism just drops the envelopes randomly into the conveying system.

Another problem with the sorting systems of Alexandre and Gunn is the manner in which the sorting systems present the envelopes in a generally upright position. Because the system of Gunn relies solely on gravity to hold the envelopes in place, the vertical conveyor in that system must be tilted enough so that the envelopes will not fall forward. The tilting does not provide simple ejection from a side of the machine. The operation disclosed in Alexandre, on the other hand, delivers the envelopes in a generally upright position. However, the only supports provided in Alexandre are the two guide rails which extend above and beside the horizontal conveyor. The envelopes necessarily must lean to one of these guide rails, making the exact orientation of the envelopes unpredictable and giving an inconsistent angle for a scanner to read destination codes.

Finally, the ejection or final sorting mechanisms of Gunn and Alexandre are inefficient or would serve improperly to sort a large number of flats at a high speed. The sorting mechanism at the end of the line in Gunn requires movement of all the bins back and forth responsive to a change in sorting information. The speed of the system, therefore, is dependent upon the speed of the sorting bin moving back and forth. This system also limits the number of bins which could reasonably be used.

The ejection ports of Alexandre, on the other hand, consist of openings in the guide rails and a flap which is operated to reroute the envelopes off the line through the opening into a separate box. If an envelope is to proceed through the sorting module, no support is provided for one side of the envelope. The opening is thus a potential place for envelopes to get hung up or accidentally ejected from the line. In addition, the rerouting system of Alexandre would not work that well on a system such as is disclosed in Gunn, where the envelope is slightly slanted to the vertical.

There is a need in the art for a sorting mechanism which can more efficiently sort a large number of packages. This mechanism would preferably have a more efficient guiding and ejection system than those currently offered.

SUMMARY OF THE INVENTION

The present invention solves the above problems by providing a high speed, automated, accurate sorting apparatus for handling items such as flats. The sorting apparatus provides a lower strip conveyor belt with a substantially horizontal support surface having cleats on the belt to separate adjacent flats. The upper end of a particular flat leans against an upper strip conveyor belt having a substantially vertical support surface. The individual flats are loaded onto the conveyor belts by synchronized opposing feed belts, and are blown onto the conveyor belts by pressured air.

As the package reaches the discharge portion of the conveyor line, the package passes through a plurality of sorting modules. When the tracking computer gives an unload command, the jaws of the sorting module open and a pusher connected to a solenoid moves out to push the package onto a chute which leads into a container or bag marked with the proper destination.

More specifically described, the present invention provides an apparatus for transporting and sorting substantially planar individual items having opposing upper and lower edges. The apparatus includes a lower conveyor traveling at least partially along a travel path for supporting the lower edge of each of the items. An upper conveyor is provided which travels at least partially along the travel path, the upper conveyor for supporting the upper edge of the items. The upper and lower conveyors combine to urge the items along the travel path. A plunger is located intermediate the lower and upper conveyors and is used for ejecting the items from the path.

Data may be encoded on the items and a scanner may be provided which is located adjacent to the path for reading the data as the item moves along the path. Each individual item is then ejected by the plunger responsive to the data on the item.

An upper guide rail guide rail may be provided which extends substantially parallel to and a fixed distance from the upper conveyor, the upper guide rail for preventing the items from falling away from the upper conveyor out of the travel path. The apparatus may further have a plurality of plungers, wherein the upper guide rail is movable in segments, and each of the segments corresponds to one of the plungers and is linked to one of the plungers such that a segment moves out of the way of the item as the one of the plungers ejects the item from the path. The apparatus may also include a lower guide rail which extends substantially parallel to and a fixed distance from the lower conveyor, the lower guide rail acting to prevent a lower portion of the items from falling from the lower conveyor.

The plunger may designed such that the plunger presses the lower part of the items upward and outward as it ejects the item from the path.

The present invention also provides a method of sorting individual items moving along a path. The method includes the step of providing a guide rail along the path, the guide rail having movable segments, each of the segments configured in a first position to prevent the items from falling from the path as the items move along the path and movable to a second position where an item may be removed from the path. A next step includes placing an item on a movable location on the path. Output data is sensed on the item as the item moves along the path, the output data corresponding with the certain movable segment of the guide rail. The certain movable segment is moved to the second position and substantially simultaneously the item is ejected from the path responsive to the location on the movable track arriving substantially at the certain segment.

The present invention also provides a guiding and ejecting module for use on a line for sorting individual items, the line having a path along which the items are transported. The module includes at least one movable guide for maintaining the items on the path, the guide configured in a first position to prevent the items from falling off the first side of the path as the items move along the path and movable to a second position where an item may be removed from the first side of the path. A plunger is provided for pushing an item off the first side of the path when the guide is in the second position. The action of the guide and the plunger may be linked. An upper conveyor and lower conveyor may be provided which support the upper end and lower end of each of the items, respectively. The lower conveyor is spaced a fixed distance from the upper conveyor and with the upper conveyor forms a support system for the items.

The present invention also provides an ejection module for use in sorting individual items traveling along the path. The ejection module includes a jaw which discourages movement of the items in a transverse direction relative to the path and a plunger configured to eject the items in the direction. The jaw is configured to move away from around the item as the plunger pushes the item from the path.

Therefore, it is an object of the present invention to provide an improved apparatus and method of sorting objects.

It is a further object of the present invention to provide an improved method of depositing items into a moving conveyor system.

A further object of the present invention is to provide a feeding mechanism which can selectively deposit substantially planar individual items.

Another object of the present invention is to provide a sorting system which has ejection modules which can both guide and move away from around an object so that ejection of the objects can take place.

Still another object of the present invention to provide an ejection module which acts as a guide to both the upper and lower portions of a substantially planar item as the item moves down the path.

Yet another object of the present invention is to provide an ejection module which avoids problems of jamming of multiple letters because of the jamming of an individual letter.

It is still another object of the present invention to provide a sorting system for substantially planar objects which includes guides which allow for some correction and leeway for damaged or overstuffed objects.

Other objects, features, and advantages of the present invention will become apparent upon consideration of the following detailed description of the invention when taken in conjunction with the drawing and the appended claims.

BRIEF DESCRIPTION OF THE DRAWINGS

FIG. 1 is a schematic of two automatic sorter systems embodying the invention.

FIG. 2 is a typical flat letter, known in the industry, which may be sorted by the automatic flat sorters of FIG. 1.

FIG. 3 is a side view of a feeding mechanism embodying the invention.

FIG. 4 is a top view of the feeding mechanism of FIG. 3, with parts broken away to show interior detail.

FIG. 5 is a top view of an alternative embodiment of a feeding mechanism embodying the invention.

FIG. 6 is a side view of an ejection module for use in the automatic sorting system of the invention, with the ejection module in a closed, or travel, position.

FIG. 7 is a side view of the ejection module of FIG. 6, with the ejection module in an opened, or ejection, position.

FIG. 8 is a front view of two ejection modules such as are shown in FIGS. 6 and 7, with one of the ejection modules opened, and the other closed.

FIG. 9 is a side view of an alternate embodiment of an ejection module embodying the invention, with the ejection module in a closed, or travel, position.

FIG. 10 is a side view of the ejection module of FIG. 9, with the ejection module in an open, or ejection, position.

DETAILED DESCRIPTION OF THE EMBODIMENT

Referring now in more detail to the drawing, in which like numerals represent like parts throughout the several views, FIG. 1 shows two automatic sorting systems 10 embodying the present invention. The two sorting systems 10 are similar in configuration and each include a path 12, the two paths being placed in substantially parallel, back-to-back relationship in the figure. The paths 12 each include feed stations 16 for depositing individual items or objects to be sorted in the system 10. A data scanner 18 is located just past the feed stations 16 on each of the paths 12 and a plurality of ejection modules 20 are located past the scanners at spaced intervals along each of the paths 12. Discharge chutes 22 extend outwardly and downwardly from each of the ejection modules 20 to guide ejected objects to separate bins 24. Briefly described, objects fed from the feed stations travel down the path 12 while data are scanned by the scanner 18, and finally are ejected at one of the ejection modules 20 into a chute 24, the particular ejection module determined by the scanned data. For ease of description, hereinafter the design and operation of only one system 10 will be described.

Each system 10 disclosed in the drawings is designed to sort typical flat letters in the shipping industry. Such a flat letter 30 is shown in FIG. 2. The flat letter 30 is typically made at least partially of cardboard, and is designed to receive a specified thickness or weight of paper therein while maintaining a semi-rigid formation. The flat letters 30 define two opposing primary planar surfaces 31, 32. One planar surface 31 includes a destination code 33, such as a bar or other code, which is encoded and may be placed on the flat letter by delivery and service personnel. Adjacent to the destination code 33 is an address label 34, which may be applied by the customer. The letters have a typical size of 9 ½ inches height (designated by the letter A in FIG. 2) by 12 ½ inches length (designated by the letter B in FIG. 2). The flat letter defines an upper edge 35, a lower edge 36, a leading edge 37, and a trailing edge 38.

FIG. 3 discloses a side view of a feeding mechanism 40 such as is located at each of the feed stations 16 along each automatic sorting system 10. The feeding mechanism 40 is used to deposit the flat letters 30 on the path 12 such that their primary planar surfaces 31, 32 are substantially vertical. With reference to FIG. 3, the feeding mechanism 40 includes an upper conveyor 42 and a lower conveyor 44. The conveyors 42, 44 are synchronized and include separating cleats 46 along their length.

The upper and lower conveyors 42, 44 work together to contain the upper and lower edges 35, 36 of the flat letters 30. Air injectors 48 (see FIG. 4) are included at the discharge end of the conveyors 42, 44, for blowing the flat letters 30 off the end of the feeding mechanism 40 onto the path 12. A feeding slot 50 is included at the leading end of the feeding mechanism 40 for depositing the flat letters 30 into the feeding mechanism 40.

An alternate embodiment of a feeding mechanism 140 is shown in FIG. 5. In this embodiment, conveyors 142, 144 extend substantially vertical and the flat letters 30 are positioned therebetween in a substantially vertical orientation. Air injectors 48 (not shown) am preferably used on this embodiment as well, and are located above and below the letters 30. In operation, the conveyors 142, 144 contain the leading and trailing edges 37, 38 of the flat letters 30.

Referring back also to FIG. 3, to properly understand the function of the feeding mechanism 40, the movement along the path 12 downstream of the feeding mechanism must first be explained. The path 12 includes a lower path conveyor 60 and an upper path conveyor 62. The lower path conveyor 60 defines a substantially horizontal support surface in the form of a belt 64. In addition, the lower conveyor belt 64 preferably includes transverse cleats 66 which separate positions 68 on the lower conveyor belt 64 for receiving individual flat letters 30. The upper conveyor 62 defines a substantially vertical support surface in the form of a belt 69. The upper and lower conveyors 62, 60 together define the substantially straight path 12 along which the flat letters 30 travel prior to being ejected from the path. As can be seen in FIG. 3, the lower conveyor belt 64 supports the lower edge 36 of the flat letters 30, while the upper edge 35 leans against the upper conveyor belt 69.

Operation of the feeding mechanism 40 may be described as follows. The flat letters 30 are fed through the feeding slot 50 into the feeding mechanism 40. The flat letters 30 preferably are fed with the destination code 33 in an orientation such that when the flat letters are placed in the path, the code is accessible to the scanners 18 when the flat letter 30 moves down the path 12. Thus, as FIG. 4 is viewed, the flat letters 30 are fed with the planar surface 31 facing the right. The upper and lower feeding conveyors 42, 44 are driven by a high speed stepping motor (not shown), such as is known in the industry. After the flat letters 30 are fed into the slot, the letters are caught between a corresponding pair of cleats 46 on the upper and lower feeding conveyors 42, 44 of the feeding mechanism 40. The upper and lower feeding conveyors 42, 44 move forward in synchronicity with one another.

When the feeding conveyors 42, 44 have moved a flat letter 30 into a position to be inserted into the line, the two feed conveyors 42, 44 move rapidly forward to release the flat letter 30 and then stop. Substantially simultaneously to this stopping, a series of two or more air jets from the air injectors 48 apply air pressure to the flat letter 30 so that the letter may rapidly enter the stream of the moving path 12 between two cleats 66 of the lower conveyor belt 64. If a letter is already in the location 68 on the lower conveyor belt 64, a presence photocell 70 will detect its presence and will inhibit the feeding mechanism 40 from operating until a space is available. Multiple feeding mechanisms 40 may be employed to match the capacity of the automatic sorting system 10.

It should also be understood that a mechanical "picking" device such as is known in the art could be used in combination with or in replacement of the air blasts to facilitate transfer of letters from the feeding conveyors into the sorting path.

As discussed in further detail below, after the flat letters are deposited into the sorting path 12, the letters pass a code scanner 18, and then pass a presence photocell (not shown) immediately downstream of the data scanner. The letters then pass through a series of side-by-side ejection modules 20, which, depending on their mode of operation, can allow letters to pass through to the next module 20, or to be ejected from the path.

An ejection module 20 for use in the present invention is pictured in FIG. 6. As can be seen from that drawing, the module 20 includes a pusher 80 having a push rod 82 and a push pad 84. In one embodiment, the push pad 84 extends further out at its base than its top, the advantage of which will be described below.

The push rod 82 of the ejection module 20 extends into a high speed electric linear actuator 86. The actuator 86 may alternatively be substituted with a solenoid or pressurized air. An upper linkage 88 and a lower linkage 90 are attached at a central pin 96 at slots 89, 91 to the rod 82 at a location forward of the high speed electric actuator 86. The upper linkage 88 includes an upper guide rod 92 which extends a fixed distance from and substantially parallel to the upper conveyor 62 when the ejection module 20 is in the closed, or "travel", position, such as is shown in FIG. 6. Likewise, the lower linkage 90 includes a lower guide rod 94 which extends just above and just to the right of the lower conveyor 60. The upper and lower linkages 88, 90 are positioned to pivot about a stationary upper pivot point 98, and a stationary lower pivot point 100, respectively. A return spring 102 is preferably attached at one end to either the upper or lower linkage and attached at the other end to a fixed position.

The ejection module 20, in one operational mode, contains flat letters 30 travelling on the path 12 to guide and prevents falling of the letters. The flat letters 30 travel along the upper and lower path conveyor belts 69, 64 at a high speed and are kept from falling over by the guiding effect of the upper and lower rods 92, 94. The arrangement of the upper rod 92 prevents the upper edges 35 of the flat letters 30 from falling too far away from the upper conveyor belt 69, and the lower rod 94 serves to position the lower end 36 of the letter in the center of the lower conveyor belt 64. Thus, the upper linkage 88, along with the guide rod 92, serves as a jaw which extends over and around the top edge 35 of the flat letters 30 as they travel down the path 12. Likewise, the lower linkage 90, along with the lower guide rod 94, serves as a jaw which extends under and around the flat letters 30 as they travel down the path 12. This allows the flat letter 30 to be delivered in a substantially upright position at a high speed, with some degree of "slack" provided between the upper rod 92 and the upper conveyor belt to compensate for thick or deformed flats.

The ejection module 20 also serves to remove a flat letter 30 from the path 12 when the flat letter reaches the ejection module 20 which matches its destination code 33. The feed station 16 and ejection modules 20 work together with the path 12 so that flat letters 30 may be sorted at a high speed and a large number of destinations by automation. Once the flat letters 30 are placed on the path 12 by the feeding mechanism 40, the letters 30 proceed down the path 12 and are tracked in accordance with prior art methods. The scanner 18 reads the destination code 33 on the flat letter 30 and a programmable logic controller (not shown) selects a destination, or certain ejection module 20, for the flat letter 30. A tracking photocell (not shown), just downstream of the code scanner 18, identifies the actual presence of the letter and matches this with its destination and starts the count on a shaft encoder (not shown).

When the shaft encoder registers the correct number of pulses for the specific destination, a signal is sent to the programmable logic controller which causes the high speed electric actuator 86 to activate, forcing the push rod 82 to extend rapidly outward as the matching flat letter 30 reaches a position immediately in front of the pusher pad 84. The movement of the push rod 82 forward causes the upper and lower linkages 88, 90 to pivot about the stationary pivot points 98, 100 and the slots 89, 91 to travel along the central pin 96 such that the upper and lower linkages are moved to the position shown in FIG. 7. This arrangement of the upper and lower linkages 88, 90 moves the upper and lower guide rods 92, 94 out of the way so that the flat letter 30 may be ejected from the path of the automatic sorting system 10. Thus, the jaws open and allow the flat letters 30 to be ejected. Because the push pad 84 extends further outward at its lower end, it ejects the lower edge 36 of the flat letter 30 out further than the upper edge 35 so that the flat letter lands on the chute 22 and slides into the bin 24 with the destination code 33 and address label 34 facing upward. Moreover, the orientation of the push pad 84 relative to the letter 30 causes the letter to be ejected upwardly and outwardly so that it will not get hung up on the lower conveyor belt 64 as it is ejected from the path 12 into one of the bins.

Once the bins 24 are full, they are ready to be carried to other sorting machines 10, or directly to a carrier. A letter 30 that is not sorted for any reason will simply exit the automatic sorting system 10 at its end and fall into a reject bin (not shown).

An alternative embodiment of an ejection module 120 is shown in FIG. 9. As can be seen in that figure, the ejection module 120 includes a high speed actuator 186 and push rod 182 which are similar to the actuator 86 and push rod 82 of the first embodiment. However, this embodiment includes only one linkage 188 which pivots from a stationary upper pivot point 198 and is attached to a return spring 202. This linkage 188 has at one end an upper guide rod 192 and at the other end a pusher pad 184.

As with the first embodiment, the upper guide rod 192 serves to prevent the flat letter 30 from falling too far forward when the ejection module 120 is in the travel position. As in the previously-discussed embodiment, the spaced-apart relative positioning of the upper guide rod 192 and the upper conveyor 62 allows for some "slack" therebetween to facilitate handling of thick or deformed flats or packages. To maintain the lower edge 36 of the flat letter 30 on the lower conveyor belt 64, the lower conveyor belt 64 in this embodiment includes one beveled side 166 and a sloped side 168. The beveled side 166 serves to prevent the flat letter 30 from extending too far left in FIG. 9 and the sloped side 168 serves to hold the flat letter 30 in a central position on the belt 164 until it is ejected.

As can be seen by FIG. 10, the ejection module 120 is designed such that when the high speed electric actuator 186 is activated, the push rod 182 extends outward and the upper guide rod 192 moves out of the way. As this upper guide rod 192 is moving, the pusher pad 184 contacts the bottom half of the flat letter 30 and presses it in the direction of the chute 22. Because the pusher pad 184 presses the bottom portion of the flat letter 30 upward and outward as the push rod 182 extends, the flat letter lands on the chute with the destination code 33 and address label 34 exposed. This upward and outward movement also pushes the bottom edge of the flat letter 30 up and over the sloped surface 168.

It may be understood that one of the distinct advantages provided by the present invention is that of "positive displacement" of the flats from the sorting path out of the sorting path by the use of mechanical plungers. As may be understood, flats, packages, or any objects being moved high speed may tend to jam, and a jam of one letter can quickly become a jam of a multitude of letters. The present invention, when using a mechanical plunger, provides a lesser chance of risk by positively displacing the entire letter from the path with a plunging action, which is believed to be an improvement over "gated" types of sorters which tend to provide jam points due to the potential of letters becoming pinched when the gates close.

It should be understood that there are several alternative sorting configurations which could be used without departing from the spirit and scope of the present invention. For example, data scanners could be used on both sides of the sorting path in order to read data on either side of the path, such as would be the case if the flats were not fed into the path with data consistently positioned on one side. In such a situation where the flats are introduced into the path in more "random" fashion, the ejection modules could, if desired, be modified to include two plungers or pusher pads, with a lower pusher pad used to provide the action described above, and a second, "higher" pad actuated when the data is recognized to be on the other side of the flat. In such a system, the flats would be turned in a manner such that the encoded data would be consistently oriented (e.g. facing upwardly) regardless of the orientation of the data when the flats are in the sorting path.

It should also be understood that an air blast could be used in place of the plungers, although this would not provide the "positive displacement" feature discussed above.

As can be understood from the foregoing, the sorting system 10 of the present invention overcomes many problems in the prior art. The feeding mechanism 40 inputs objects to be sorted in a systematic order. The ejection module 20 offers not only a supported guiding system, but also an efficient ejection system which may be used to sort a large number of packages to a large number of destinations. Although the automatic sorting system 10 described in the specification is developed to specifically sort flat letters 30, it is to be understood that the principles of the sorting system 10 could be employed for any size or shape of items to be sorted.

While the present invention and its various aspects has been described in detail with regard to preferred embodiments thereof, it should be understood that variations, modifications and enhancements can be made to the disclosed apparatus and procedures without departing from the spirit and scope of the present invention as defined in the appended claims.

I claim:

1. An ejection apparatus for use in sorting individual items traveling along a path, said ejection apparatus comprising:
   a jaw which discourages movement of said items in a transverse direction relative to said path;
   a plunger configured to eject said items in said direction,
   wherein said jaw is configured to extend under said items, as well as around said items, as said items move down said path, and wherein said jaw is configured to move away from around said item as said plunger pushes said item from said path.

2. A guiding and ejecting apparatus for use on a line for sorting individual items, said line having a path along which said items are transported, said path comprising an upper conveyor for supporting said upper end of each of said items; and a lower conveyor for supporting said lower end of each of said items, said lower conveyor being spaced a fixed distance from said upper conveyor and with said upper conveyor forming a support system for said items, said apparatus comprising:
   at least one movable guide for maintaining said items on said path, said guide configured in a first position to prevent said items from falling off a first side of said path as said items move along said path and movable to a second position where an item may be removed from said first side of said path; and
   a plunger for pushing an item off said first side of said path when said guide is in said second position said plunger designed such that it pushes the lower part of said item upward and outward as it ejects said item from said support system.

3. The guiding and ejecting apparatus of claim 2, wherein said plunger is configured such that the lower portion of said plunger extends further outward than the upper portion of said plunger such that outward movement of said plunger causes said upward and outward ejection of said item relative said plunger, upon being contacted by said plunger.

4. An ejection apparatus for use in sorting individual items traveling along a path, said apparatus comprising:
   a jaw which discourages movement of said items in a first transverse direction relative to said path;
   a conveyor for urging said items along said path and providing a supporting surface which discourages movement in an opposite direction relative to said first transverse direction;
   a plunger movable relative to said conveyor configured to eject said items in said first transverse direction away from said supporting surface at said conveyor,
   wherein said jaw is configured to move away from around said item as said plunger pushes said item from said path, and Wherein said law is configured to extend under said items, as well as around said items, as said items move down said path.

5. An ejection apparatus for use in sorting individual items traveling along a path, said ejection apparatus comprising:
   a first jaw which discourages movement of said items in a transverse direction relative to said path;
   a second jaw which extends around said items to guide and prevent failing of said items;
   a plunger configured to eject said items in said direction,
   wherein said first jaw is configured to move away from around said item as said plunger pushes said item from said path; and wherein one of said jaws extends over and around said items as they move down said path and said other jaw extends under and around said items as they move down said path.

\* \* \* \* \*